Sept. 10, 1957 — N. C. GOEHLE — 2,805,587

SAW SHARPENER

Filed April 11, 1952 — 3 Sheets-Sheet 1

INVENTOR.
Nelson C. Goehle
BY
Poppe and Sommer
ATTORNEYS.

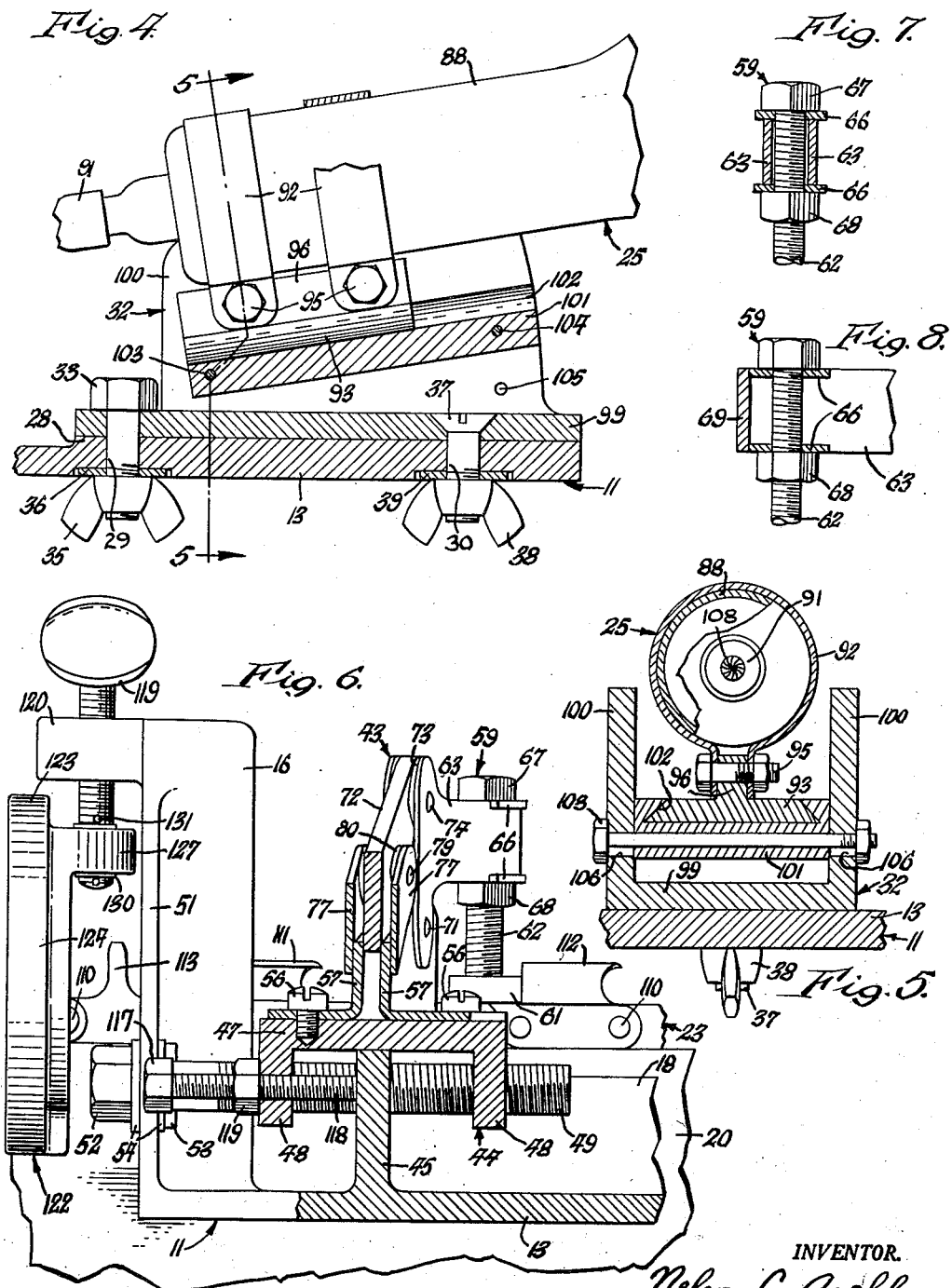

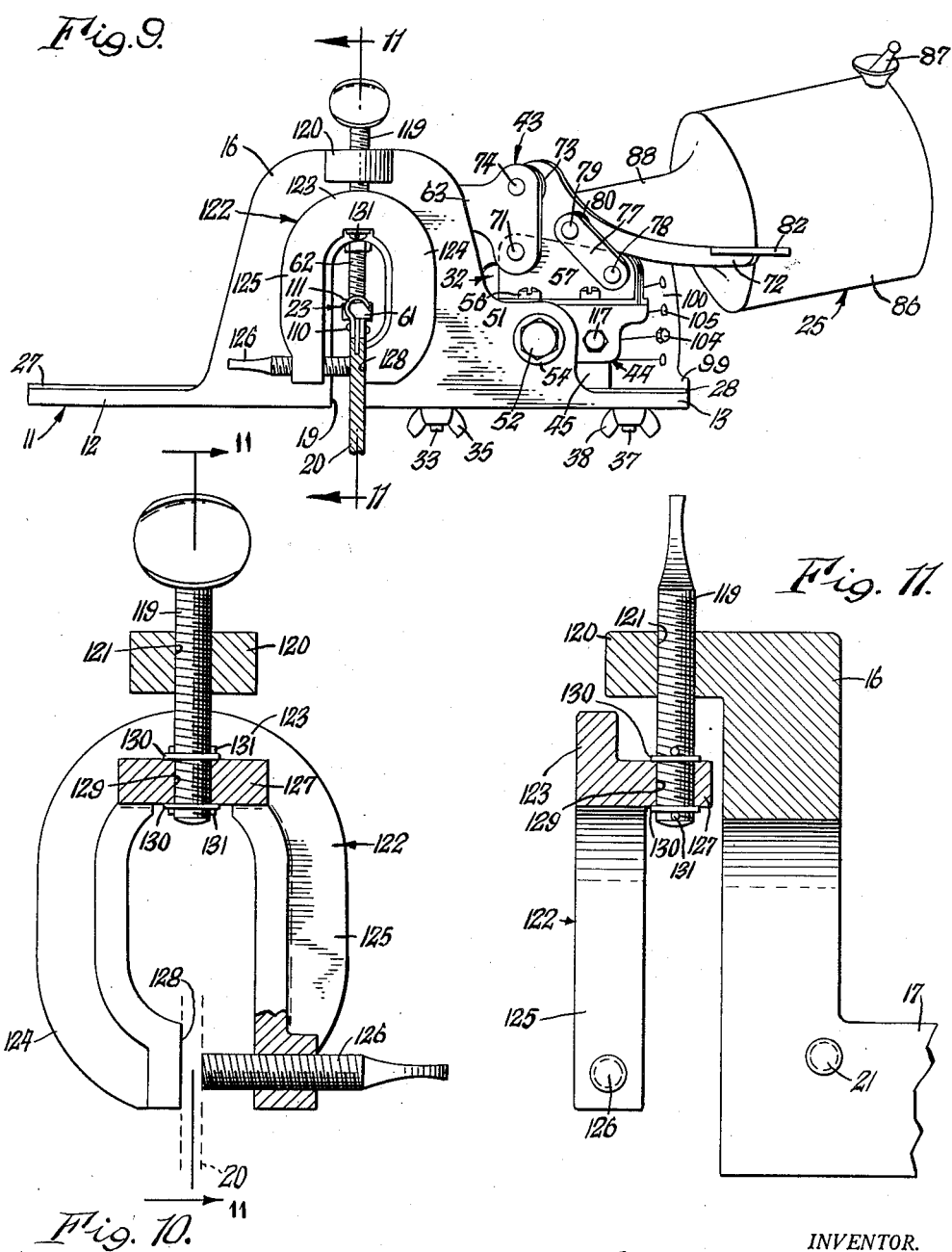

United States Patent Office 2,805,587
Patented Sept. 10, 1957

2,805,587

SAW SHARPENER

Nelson C. Goehle, Lockport, N. Y.

Application April 11, 1952, Serial No. 281,855

16 Claims. (Cl. 76—41)

The present invention relates to saw sharpeners and is particularly concerned with sharpening apparatus for power-driven chisel tooth, chain saws.

It is an object of the invention to provide a saw sharpener of the type described which is capable of precise and uniform grinding or sharpening of saw chain teeth.

Another object of the invention is to provide a saw sharpener of the type described which is adapted to conveniently grind both right-hand and left-hand teeth to the same angles and length.

Still another object of the invention is to provide a saw sharpener of the type described which may be used without dismounting the saw chain from the saw guide and which is easily portable.

A further object of the invention is to provide a saw sharpener of the type described which comprises a clamp that indexes to the proper position the saw tooth to be sharpened and also firmly holds the tooth in position while it is sharpened.

Another aim is to provide a fine adjustment which includes adjusting screws and separate clamps and which permits of a very fine adjustment of the elevation of the sharpening element or burr with reference to the saw teeth. This is particularly important in obtaining a fine differential in height of the chisel or cutting teeth and the alternating raker teeth which remove the chips, such differential varying with different makes of saws and when cutting different woods and such differential being required to be held within close limits for proper performance of the saw.

An additional object of the invention is to provide in a saw sharpener of the type described a detachable and adjustable grinder which may be mounted on either side of the saw chain to permit sharpening of both right-hand and left-hand teeth without unclamping the sharpener from the chain saw.

Other objects and advantages of the invention will be apparent from the following description taken in conjunction with the accompanying drawings.

In the drawings:

Figure 4 is an enlarged view, taken on the line 4—4 of Figure 1, similar to Figure 3 but showing parts of the mounting in section;

Figure 5 is a transverse sectional view of the grinder and mounting taken generally on the line 5—5 of Figure 4 and showing part of the grinder housing, including the grinding burr and its chuck, in elevation;

Figure 6 is an enlarged fragmentary sectional view, taken on the line 6—6 of Figure 1, showing certain details of the tooth-holding clamp;

Figure 1:
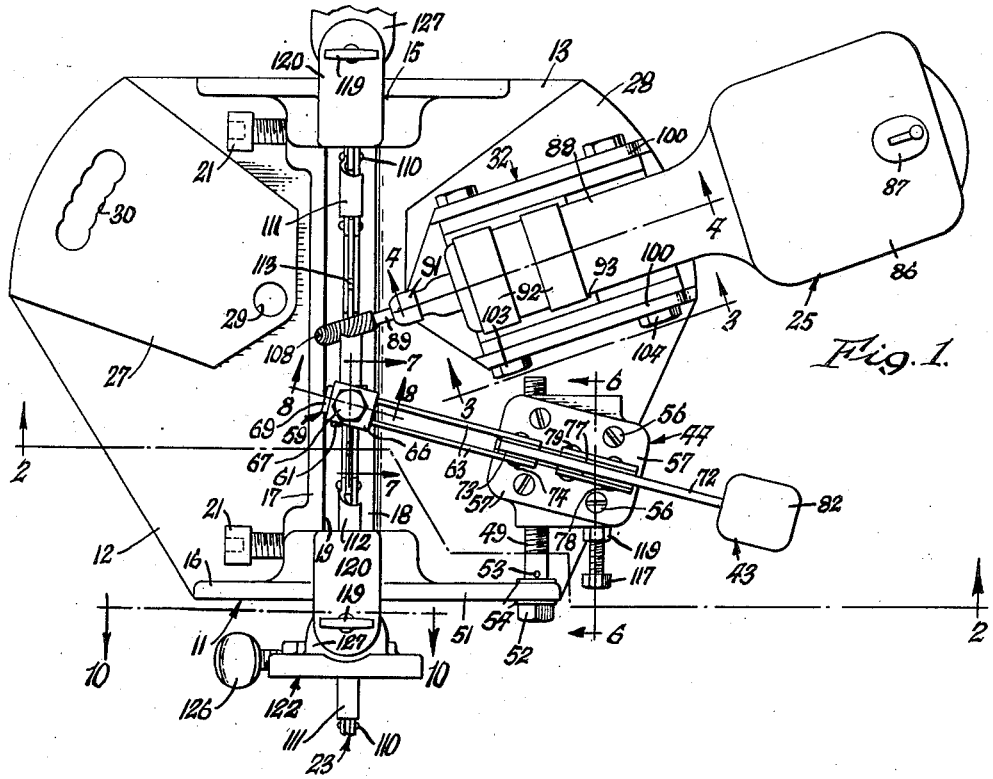
Figure 1 is a plan view of a saw sharpener constructed in accordance with the present invention.

Figures 7 and 8 are fragmentary sectional views, taken respectively, on the lines 7—7 and 8—8, respectively, of Figure 1, showing the vertical adjusting means for the tooth-holding clamping head.

Figure 9 is an end elevational view of the saw sharpener.

Figure 10 is a fragmentary vertical section taken on line 10—10 of Figure 1.

Figure 11 is a fragmentary enlarged vertical section taken generally on line 11—11 of Figure 9 and also on line 11—11, Fig. 10.

As is best seen in Figure 1, the portable saw sharpener of the present invention comprises a flat rigid table designated generally by the numeral 11 which is formed by a pair of plates 12 and 13 joined in spaced relation at their opposite ends by upwardly extending yokes 15 and 16 which preferably are formed integrally with the plates.

The parallel adjacent edges of the plates 12 and 13 are formed, respectively, with upwardly extending, vertical flanges 17 and 18. There is thus provided a longitudinal slot 19 between the plates 12 and 13, that is defined by the yokes 15 and 16 and the plates 17 and 18, and within which there may be inserted the chain saw which is to be sharpened.

An important feature of the present invention is the convenience with which the novel, portable saw sharpening apparatus herein described may be used. It is unnecessary to remove the saw chain from the saw guide for sharpening the teeth on the chain and no special supports or separate jigs are required. It is only necessary to support the saw in a vertical position with the upper edge of the saw guide and saw chain thereon extending into the slot or passage 19 between the plates 12 and 13.

Figure 2:
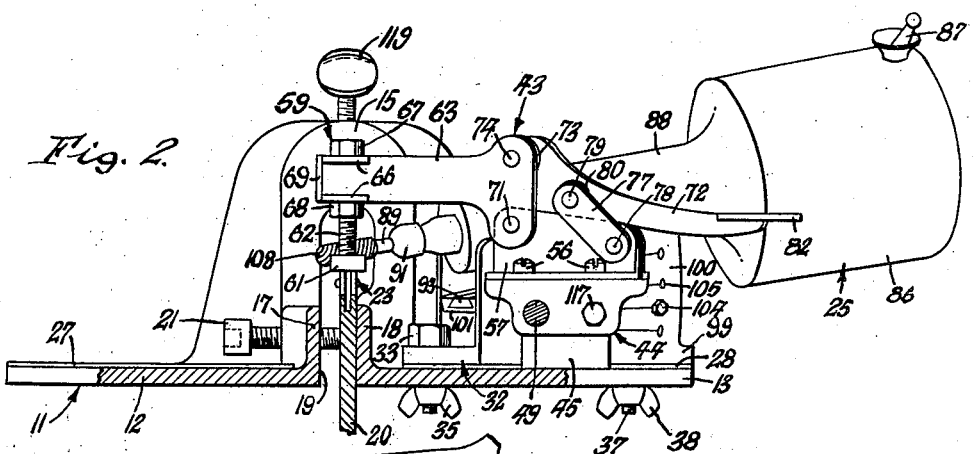
Figure 2 is a vertical sectional view taken on the line 2—2 of Figure 1.
Figure 3:
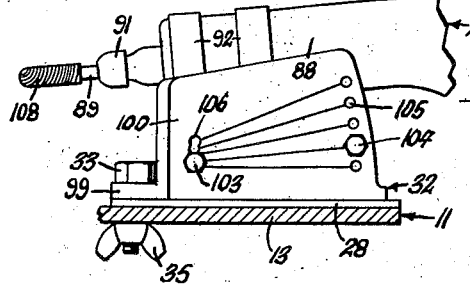
Figure 3 is an elevation of the mounting for the motor driven grinder taken on the line 3—3 of Figure 1 showing a portion of the grinder and a portion of the sharpener table in section.

Referring now to Figure 2, it will be seen that the saw guide 20 of the saw to be sharpened extends upwardly into the slot 19 between the flanges 17 and 18 and is adapted to be releasably clamped against the flange 18 by screws 21 which are mounted adjacent the ends of the plate 12 in thickened portions of the flange 17. The saw chain 23 is, however, not clamped but is free to slidably move along the edge of the guide 20.

A motor driven grinder, designated generally by the numeral 25, is detachably mounted on the table 11, the plates 12 and 13 being provided, respectively, with slightly elevated, preferably integral, flat platforms 27 and 28 therefor. The platforms are provided at their adjacent, inner ends with mounting holes 29 and at the other end of each platform there is provided an arcuate mounting slot 30. The grinder 25 is carried on a base 32 which is adapted to be fixed (see Fig. 4) to one or the other of the platforms 27 and 28 by bolts 33 and 37. The bolt 33 passes through the base and the mounting hole 29 of the platform and is retained in place by a wing nut 35 that bears against a washer 36. The bolt 37 passes through the base 32 and the arcuate mounting slot 30 and is held in the desired position in the latter by a wing nut 38 bearing against a washer 39.

There is also provided on the sharpener table 11 a toggle clamp 43, Fig. 6, which is adapted to hold the saw chain firmly in proper predetermined position while the teeth thereof are sharpened. The clamp 43 is supported on a saddle carriage 44 that is mounted for sliding movement longitudinally of the table 11 and parallel to the slot 19 on a transverse web 45. The latter projects upwardly from and is preferably integral with the plate 13. The carriage 44 comprises a plate 47 resting on the web 45 and having at each end an integral, depending flange 48. An adjusting screw 49 threadedly engages in aligned holes in the flanges 48 and passes through the web 45 between the flanges. At its outer end the screw 49 passes through a lateral fin 51 of the yoke 16 and is rotatably secured therein, with its head 52 outside the fin, by a pin 53. Washers 54 are provided between opposite sides of the fin 51 and the screw head 52 and pin 53, respectively. The carriage 44 is thus adapted to be reciprocated on the web 45 by rotation of the screw 49.

Extending upwardly from the top of the plate 47, to which they are secured by a plurality of cap screws 56, are a pair of spaced brackets 57 adapted to support a clamping head 59 and operating linkage therefor. The clamping head 59 comprises a holding block 61 that is adapted to engage the tops of links in the chain 23 and is carried by a vertically adjustable screw threaded rod 62. The rod 62 extends upwardly between the outer ends of a pair of parallel levers 63 on which it and the block 61 are supported. On their edges the levers 63 are recessed to receive bearing plates 66. The latter coact with upper and lower lock nuts 67 and 68, respectively, threadedly mounted on the rod 62 to adjust the position of the block 61 and thus regulate the pressure applied thereby on the chain 23. To increase the rigidity of the head assembly, the outer ends of the levers 63 are joined by a plate 69 which may conveniently be welded thereto.

The inner end of each of the levers 63 is pivotally mounted as by a rivet 71 on the outside of one of the brackets 57. There is also connected to the levers 63 at a point above and spaced from rivet 71 one end of an actuating lever 72. The lever 72 extends between the levers 63, being spaced therefrom by washers 73 and the three levers are joined by a pin or rivet 74. The actuating lever 72 is also pivotally connected, intermediate its ends, to the brackets 57 by a pair of spaced parallel links 77. A pin or rivet 78 pivotally supports one end of each of the links 77 on the outsides of the brackets 57. At their other ends the links 77 are pivotally joined to the lever 72 by a rivet or pin 79 that extends through the links, the lever and a pair of intervening spacing washers 80. The free end of the lever 72 is provided with an operating hand plate 82 which, when depressed, moves the clamping head 59 downwardly to cause the block 61 to engage the saw chain 23.

As previously described, the grinder 25 is provided with a mounting base 32 which is adapted to be adjustably secured by bolts 33 and 37 on either of the platforms 27 and 28 so that the chisel saw teeth, alternate ones of which face in opposite directions, on the saw chain 23 may be properly sharpened or ground. The grinder 25 comprises a housing 86 within which there may be provided an electric motor (not shown) having a connection (not shown) to a suitable source of electrical power controlled by a toggle switch 87. An axial tubular extension 88 of the housing 86, through which there runs a shaft 89 from the motor to collet or chuck 91, is surrounded by a pair of clamping rings 92 for attachment to a slide 93. Bolts 95 secure the outwardly extending ends of the clamping rings 92 to a longitudinal, upwardly extending fin or flange 96 preferably formed integrally with the slide 93.

The grinder base 32 comprises a bottom 99 which is provided with parallel, upwardly extending, spaced flanges 100. Mounted between the flanges 100 by bolts 103 and 104 is an adjustable block 101 which provides a dovetail guide or way 102 for the slide 93. A series of spaced, arcuately arranged holes 105 is provided adjacent one end of each of the flanges 100 with the holes in each flange horizontally aligned with the corresponding holes in the other flange. Adjacent the other end of each flange 100 is an arcuate slot 106, the slots 106 in the two flanges also being aligned. Angular adjustment of the grinder 25 in a plane perpendicular to the table 11 is obtained by suitable vertical positioning of the bolt 103 in the slots 106 and insertion of the bolt 104 through appropriate aligned holes 105 in the flanges 100.

From the foregoing description, it will be seen that the grinder 25 and the burr or other grinding element 108 carried by the collet 91 may be adjusted in a horizontal plane with reference to the slot 19 and the saw teeth by proper positioning of the grinder base 32 on the platform 27 or 28 and may be angularly adjusted in a vertical plane with reference to the saw teeth by proper positioning of the bolts 103 and 104 in the slots 106 and holes 105, respectively. At the same time the burr may be advanced or retracted with respect to the teeth by movement of the slide 93 carrying the grinder in the dovetail way 102 provided in the block 101. Great accuracy is thus possible in grinding the teeth of the saw chain 23, and, since the grinder base may be locked in adjusted position, all of the saw teeth may be ground or sharpened to the same angle without difficulty.

The saw chain 23 is typical of the saw chains used with power driven chain saws. It comprises a plurality of links pivotally connected by pins or rivets 110 and having cutting teeth on alternate links. The cutting teeth are, as shown in the drawings, curved over the top of the saw chain and sharpened at a suitable angle on their forward edges to form arcuate chisels. The cutting teeth are arranged with a right hand tooth 111 and a left hand tooth 112 alternating. On the chain links intervening between each pair of cutting teeth 111 and 112 there are provided kerf-clearing or raker teeth 113 which, as shown, may be merely fingers.

The raker teeth 113 are of lower elevation than the cutting teeth 111, 112 but it is important that the differential in height of these teeth be maintained within quite close limits. The function of the raker teeth is to clear the chipped material and if the raker teeth are too low, in relation to the cutting teeth, they will not properly remove the chips. On the other hand if the raker teeth are too high, with reference to the cutting teeth, they will hold the cutting teeth away from the workpiece and reduce sawing efficiency. Further the proper difference in height between the raker teeth and the cutting teeth varies with different woods and also with different makes of saws where the teeth are of somewhat different shape.

Accordingly it is desirable to be able to grind the ends of the raker teeth 113 down to exactly the desired height with reference to the cutting teeth 111, 112 to suit the particular make of saw or the particular wood being handled. To this end an ear 120 is provided on each yoke 15, 16 to project horizontally therefrom in line with the slot 19 but away from the center of the tool. A thumb screw 119 works in an internally threaded hole 121 in this ear. Each of these thumb screws is rotatably connected with a C-clamp indicated generally at 122. This C-clamp has an upper cross part 123 and depending legs or sides 124, 125 which are separated at their lower ends to embrace the guide 20. A horizontal thumb screw 126 is threadedly mounted in the lower end of the leg 125 to screw toward a vertical clamping face 128 at the lower end of the leg 124. When the guide 20 is interposed between the face 128 and thumb screw 126 and the thumb screw 126 tightened each clamp 122 is secured to the guide.

The rotatable connection between each thumb screw 119 and its companion clamp 122 is through a horizontal ear 127 integral with the corresponding clamp 122 and projecting from its cross piece 123 under the ear 120. Each ear 127 has a smooth or unthreaded bore 129 through which the thumb screw 119 extends but can freely turn. Above and below the ear 127 washers 130 are provided around the shank of the thumb screw 119 and each of these washers is backed by a cross pin 131. It will be seen that by turning the two thumb screws 119 the yokes 15, 16, together with the plate 12, 13 which they connect, are raised and lowered with reference to the C-clamp 122, this providing a fine adjustment of the elevation of the cutting burr 108 with reference to both the raker teeth 113 and the cutting teeth 111, 112 of the saw.

The sharpening of the chisel cutting teeth 111 and 112 by the portable sharpening apparatus of the present invention may be accomplished easily, quickly, and with extreme accuracy either in a shop or in the field without removing the saw chain 23 from the guide 20. With the saw arranged and held in substantially vertical position the rigid table 11 of the sharpener is placed over the saw in such position that the saw chain 23 and top edge of the saw guide 20 extend into the slot 19. After adjusting the table to properly align the chain 23 the saw guide is clamped to the flange 18 by the screws 21, leaving the chain free for sliding movement around the guide to permit the teeth to be indexed into proper position for sharpening.

As shown in the drawings, the grinder 25 has been mounted on the platform 28 for sharpening left hand teeth 112. This is done by passing the bolts 33 and 37 through the bottom 99 of the base 32 and through the mounting hole 29 and the arcuate slot 30, respectively, in the plate 13. After the proper horizontal angular adjustment of the base 32 has been secured, the base is locked by tightening the wing nuts 35 and 38 on the bolts. The desired vertical angular adjustment of the block 101 in the base 32 is then obtained by passing the bolt 103 through the proper holes 105 in the flanges 100 of the base 32 and securing the bolt 104 in the corresponding position in the slots 106 thereof. When the base 32 and block 101 are thus adjusted and secured, the grinding element or burr 108 carried by the grinder 25 may be reciprocated across the front edge of a tooth 112 by movement of the slide 93, that carries the grinder, in the dovetailed way 102 of the block to sharpen and restore the forward cutting edge of the tooth to the desired shape.

The tooth 112 is held against displacement while being sharpened by the toggle clamp 43. As best seen in Figures 1 and 6 the holding block 61 on the clamping head 59 engages the link of the tooth 112 immediately back of the tooth and presses it firmly against the guide 20. The block 61 thus serves not only to hold the chain steady during sharpening of a tooth but also to properly position the teeth.

When sharpening of one of the left hand teeth 112 is completed the rotary sharpening element 108 is moved back and the hand plate 82 of the clamp 43 is raised, thereby raising the clamping head 59 and releasing the saw chain 23. The chain is then drawn forwardly by hand until the next left hand cutting tooth 112 is in approximate position for sharpening, whereupon the clamping head 59 is lowered by moving the actuating lever 72 downwardly until the holding block 61 is almost in contact with the chain. The tooth 112 then is moved backwardly until its rear end contacts the block 61 and, when thus positioned, the tooth is clamped by fully depressing the hand plate 82 of the lever 72. The second tooth 112 may then be sharpened in the same manner as the first and the above described sequence of operations may be continued until all of the left hand teeth 112 have been sharpened.

At this point the grinder 25 on its slide 93 is withdrawn from the base 32 and the base is transferred to the other platform 27 to which it may be quickly secured by the bolts 33 and 37 at the same horizontal angle with respect to the slot 19 and chain 23 as it was on the platform 28. When the slide 93 is reinserted in the dovetail guide 102 the right hand cutting teeth 111 of the saw chain 23 may be successively sharpened in the same way that the left hand teeth were sharpened. It will be noted that there is no necessity for changing the vertical angular adjustment of the block 101 in the grinder base 32 since the same vertical angle is used with both the right hand and left hand teeth. It will also be observed that both right hand and left hand teeth may be sharpened without reversing the saw chain 23 in the sharpening apparatus or readjusting the saw guide 20 in the slot 19.

As previously described, the clamp 43 is adjustably mounted on the table 11 and is capable of movement parallel to the slot 19. Such movement is controlled by operation of the adjusting screw 49. Consequently, when it is desired, the clamp 43 may be adjusted longitudinally of the slot 19 to regulate the depth of cut of the burr 108 or to bring a cutting tooth 111 or 112 into proper position for sharpening. A stop screw 117 having a lock nut 119 is threadedly engaged in one of the depending flanges 48 of the carriage 44 upon which the clamp 43 is supported. Movement of the carriage in one direction is limited by contact of the end 118 of the screw 117 with the web 45. By adjusting the screw 117 the limit of movement may be varied and then held by tightening the nut 119. Adjustment of the clamp 43 may be required to provide for variations in the lengths of the teeth which occur with different saws. Also, if desired, the cutting teeth may be indexed into exact position for sharpening by movement of the clamp.

It will be apparent from the foregoing description of the construction and operation of a saw tooth sharpener in accordance with the present invention, that such a sharpener provides an extremely useful and convenient piece of apparatus. Of primary interest is the fact that with the sharpener of the present invention it is unnecessary to remove the saw chain from the saw guide and much time and labor are, therefore, saved. The sharpener need merely be clamped to the saw guide 20 leaving the saw chain 23 carried thereon free to move and the chisel saw teeth 111 and 112 may then be quickly and accurately sharpened. The mounting means provided for the grinder base 32 is adapted to permit a quick change from the sharpening of right hand teeth to the sharpening of left hand teeth and vice versa and the mounting of the grinder 25 on the base 32 is so designed as to maintain the proper vertical angle of the tooth-sharpening element 108 during the transfer of the base from one side of the slot 19 to the other. Time is also saved by this arrangement since readjustment of the vertical angle of the grinder is not required. The quick-acting toggle clamp 43 also contributes greatly to the speed with which the teeth of a saw chain may be sharpened since after grinding one tooth the chain may be released and rapidly advanced for the grinding of another tooth and yet the tooth being ground is firmly held in place during sharpening. The clamping head 59 additionally provides a stop for fast indexing of the tooth to be sharpened to a predetermined position and obviates the necessity of using separate gauges or other measuring or indexing devices which have previously been required.

As previously outlined it is important that an exact differential be maintained between the height, or extent of projection, of the raker teeth 113 with reference to the cutting teeth 111, 112 to suit the particular make of saw or a particular wood being handled. Thus if this differential is too great the raker teeth will not effectively remove the chips and if this differential is too small the cutting teeth are held away from the wood and their cutting effect reduced. Accordingly, after the saw has been mounted to sharpen the cutting teeth 111, 112 the operator additionally tightens the two thumb screws 126 so as to secure each of the C-clamps 122 against the saw guide 20. After the sharpening of the cutting teeth 111, 112 has been completed, the operator sets the motor driven unit to bring the burr 108 to a horizontal position and in engagement with a raker tooth 113. He then turns each of the thumb screws 119 so as to lower the yokes 15, 16 and plates 12, 13 the exact distance required to provide the desired differential in height between the cutting teeth 111, 112 and the raker teeth 113. He then proceeds to grind off the ends of the raker teeth and it will be seen that each raker tooth 113 will be ground to provide exactly the desired differential between it and the cutting teeth 111, 112. By employing the thumb screws 119 it will be seen that this differential can be provided with a high degree of exactness.

As a result of its novel construction, the sharpening apparatus described herein is highly efficient and accurate. As a consequence, the cost of sharpening a saw is reduced by its use. Moreover, since all of the cutting teeth on a saw chain are keenly sharpened to precisely the same angles and to the same length by the apparatus, less frequent sharpening will be required.

It will be understood that various modifications of the structure described herein may be made without departing from the spirit of the present invention. Thus, for example, if desired the grinder may be rotated at high speed by compressed air or a flexible shaft from a suitable remote source of power instead of by an electric motor.

It will also be understood that the saw sharpener of the present invention may be formed of various suitable materials. Conveniently, however, the table 11 and yokes 15 and 16 will be formed as a unitary metal casting and most of the other elements will be made of metal. The grinding element 108 may be formed of high-speed steel, tungsten carbide, bonded abrasive material or any other substance of suitable characteristics and elements of different diameters may be employed to properly sharpen saw teeth of different sizes.

I claim:

1. Portable tooth-sharpening apparatus for chain saws comprising a rigid table, means for releasably mounting said table on a chain saw by clamping the saw guide thereof while leaving the saw chain thereof free to move, and a tooth-grinding assembly including a rotary sharpening element, said table having means for adjustably mounting said assembly on either side of said saw.

2. Portable tooth-sharpening apparatus for chain saws comprising a rigid table, means for releasably mounting said table on the edge of a chain saw by clamping the saw guide thereof while leaving the saw chain thereof free to move, and a tooth-grinding assembly including a grinder having a rotary sharpening element, said grinder being angularly adjustable in said assembly, said table having means for adjustably mounting said assembly on either side of said saw.

3. Portable tooth-sharpening apparatus for chain saws comprising a rigid table, means for releasably mounting said table on a chain saw by clamping the saw guide thereof while leaving the saw chain thereof free to move a tooth-grinding assembly including a rotary sharpening element, said table having means for adjustably mounting said assembly on either side of said saw, and means for holding said chain in successive predetermined positions during the grinding of the teeth on said chain.

4. Portable tooth-sharpening apparatus for chain saws comprising a rigid table including a longitudinal slot adapted to receive one edge of a chain saw, means for releasably clamping the saw guide of a chain saw in said slot while leaving the saw chain thereof free to move, a grinder assembly adjustably mounted on said table, and a clamp operable to engage and hold the saw chain of said chain saw in successive predetermined position during sharpening of the teeth thereof, said clamp being adjustably mounted on said table for movement parallel to said slot.

5. Portable tooth-sharpening apparatus for chain saws comprising a rigid table including a longitudinal slot adapted to receive one edge of a chain saw, means for releasably clamping the saw guide of a chain saw in said slot while leaving the saw chain thereof free to move, a grinding assembly including a base, a grinder having a rotatable tooth-sharpening element, and means for mounting said grinder in said base, said mounting means being angularly adjustable in a vertical plane and said grinder being reciprocable longitudinally of said base, said grinding assembly being adapted for mounting on said table on either side of said slot without disturbing the angular adjustment of said mounting means, and means provided in said table for permitting angular adjustment of said assembly in a plane parallel to said table.

6. Portable tooth-sharpening apparatus for chain saws comprising a rigid table, said table having a longitudinal slot therein adapted to receive one edge of a chain saw, means for releasably clamping the saw guide of a chain saw in said slot while leaving the saw chain thereof free to move, a grinder base mounted on said table on one side of said slot and angularly adjustable in a plane parallel to said table, a grinder including a rotatable tooth-sharpening element detachably mounted on said base and reciprocable therein toward and away from said slot, said grinder being angularly adjustable in a plane perpendicular to said table, and a clamp adjustably mounted on said table and operable to engage and hold said saw chain in successive predetermined positions during sharpening of the teeth thereof.

7. Portable tooth-sharpening apparatus for chain saws comprising a rigid table, said table having a longitudinal slot therein adapted to receive one edge of a chain saw, means for releasably clamping the saw guide of a chain saw in said slot while leaving the saw chain thereof free to move and means for mounting a grinder thereon on both sides of said slot, a grinder including a rotatable tooth-sharpening element detachably mounted on said table on one side of said slot, said grinder being angularly adjustable in planes parallel with and perpendicular to said table and reciprocable toward and away from said slot, and a clamp adjustably mounted on said table and operable to engage and hold said saw chain in successive predetermined positions during sharpening of the teeth thereof.

8. Portable tooth-sharpening apparatus for chain saws comprising a rigid table, said table having a longitudinal slot therein adapted to receive one edge of a chain saw, means for releasably clamping the saw guide of a chain saw in said slot while leaving the saw chain thereof free to move and means for mounting a grinder thereon, a grinder including a rotatable tooth-sharpening element detachably mounted on said table on one side of said slot and being angularly adjustable in planes parallel with and perpendicular to said table and reciprocable toward and away from said slot, and a clamp adjustably mounted on said table and operable to engage and hold said saw chain in successive predetermined positions during sharpening of the teeth thereof.

9. Portable tooth-sharpening apparatus for chain saws comprising a rigid table, said table having a longitudinal slot therein adapted to receive one edge of a chain saw, means for releasably clamping the saw guide of a chain saw in said slot while leaving the saw chain thereof free to move and means for mounting a grinder base thereon, a grinder base detachably mounted on said table and angularly adjustable in a plane parallel to said table on one side of said slot, a grinder including a housing and a rotatable tooth-sharpening element, said grinder being reciprocably mounted on said base for movement toward and away from said slot and angularly adjustable in a plane perpendicular to said base, and a clamp adjustably mounted on said table and operable to engage and hold said saw chain in successive predetermined positions during sharpening of the teeth thereof.

10. Portable tooth-sharpening apparatus for chain saws comprising a rigid table, said table having a longitudinal slot therein adapted to receive one edge of a chain saw, means for releasably clamping the saw guide of a chain saw in said slot while leaving the saw chain thereof free to move and means for mounting a grinder base thereon, a grinder base detachably and adjustably mounted on said table on one side of said slot, a grinder including a rotatable tooth-sharpening element adjustably carried by said base and reciprocable therein toward and away from said slot, and a toggle clamp adjustably mounted on said table for movement parallel to said slot and having a head adapted to engage and hold said saw chain in successive predetermined positions during sharpening of the teeth thereof.

11. Portable tooth-sharpening apparatus for chain saws comprising a rigid table, said table having a longitudinal slot therein adapted to receive one edge of a chain saw, means for releasably clamping the saw guide of a chain saw in said slot while leaving the saw chain thereof free to move and means on both sides of said slot for mounting a grinder base on said table, a grinder base detachably mounted on said table on one side of said slot and angularly adjustable thereon in a plane parallel to said table, a block carried by said base and angularly adjustable in a plane perpendicular to said table, a grinder including a housing and a rotatable tooth-sharpening element mounted on a carriage slidably engaging said block and reciprocable therein toward and away from said slot, and a toggle clamp adjustably mounted on said table for movement parallel to said slot and having a head adapted to engage and hold said saw chain in successive predetermined positions during sharpening of the teeth thereof.

12. Portable tooth-sharpening apparatus for chain saws comprising a rigid table, means for releasably mounting said table on the edge of a chain saw by clamping the saw guide thereof while leaving the saw chain thereof free to move, a tooth-grinding assembly including a grinder having a rotary sharpening element, said grinder being angularly adjustable in said assembly, said table having means for adjustably mounting said assembly on either side of said saw, and adjustable means adapted to vary the vertical distance between said rotary sharpening element and the teeth of said saw thereby to permit of grinding certain of said teeth to a predetermined differential in height with reference to other of said teeth.

13. Portable tooth-sharpening apparatus for chain saws comprising a rigid table, means for releasably mounting said table on the edge of a chain saw by clamping the saw guide thereof while leaving the saw chain thereof free to move, a tooth-grinding assembly including a grinder having a rotary sharpening element, said grinder being anguularly adjustable in said assembly, said table having means for adjustably mounting said assembly on either side of said saw, a separate clamp arranged at opposite sides of said table, means for releasably mounting each of said clamps on said chain saw, and adjustable means connecting each of said clamps and said table adapted to vary the vertical distance between fixed points on the opposite ends of said table and the teeth of said saw thereby permitting the grinding of certain of said teeth to a predetermined differential in height with reference to other of said teeth.

14. Portable tooth-sharpening apparatus for chain saws comprising a rigid table, means for releasably mounting said table on the edge of a chain saw by clamping the saw guide thereof while leaving the saw chain thereof free to move, a tooth-grinding assembly including a grinder having a rotary sharpening element, said grinder being angularly adjustable in said assembly, said table having means for adjustably mounting said assembly on either side of said saw, a separate clamp arranged at opposite sides of said table, means for releasably mounting each of said clamps on said chain saw, and adjustable screw means connecting each of said clamps and said table adapted to vary the vertical distance between fixed points on opposite ends of said table and the teeth of said saw thereby permitting the grinding of certain of said teeth to a predetermined differential in height with reference to other of said teeth.

15. A portable tooth sharpener for chain saws which comprises a rigid support, clamping means carried by said support adapted releasably to hold a chain saw tooth in position for sharpening, a grinding assembly carried by said support and adjustable with respect thereto, a grinder, having a rotating sharpening element, adjustably mounted in said assembly, said grinder being movable angularly in a vertical plane and being adapted for reciprocation in a straight line on either side of said tooth alternatively to move said sharpening element into and out of engagement with said tooth.

16. A portable tooth sharpener for chain saws which comprises a rigid support, a slotted member carried by said support adapted to receive a toothed saw chain, clamping means adapted releasably to hold one of the teeth of said saw chain in position for sharpening, a grinding assembly carried by said support and adjustable with respect thereto, said assembly including a grinder having a rotating sharpening element, said grinder being adjustably mounted in said assembly for angular movement in a vertical plane and adapted to be arranged on either side of said saw chain in such position as to permit substantially horizontal reciprocation of said sharpening element in a straight line toward and away from said chain.

References Cited in the file of this patent

UNITED STATES PATENTS

| | | |
|---|---|---|
| 2,422,871 | Wilson | June 24, 1947 |
| 2,460,189 | Perry | Jan. 25, 1949 |
| 2,568,062 | Fitch | Sept. 18, 1951 |
| 2,589,165 | Toy et al. | Mar. 11, 1952 |
| 2,643,553 | Evanoff | June 30, 1953 |

FOREIGN PATENTS

| | | |
|---|---|---|
| 455,128 | Canada | Mar. 15, 1949 |